April 5, 1966

D. RICHMAN 3,244,807

SIGNAL-PRECORRECTING APPARATUS FOR MINIMIZING QUADRATURE DISTORTION

Original Filed Jan. 24, 1957

3 Sheets-Sheet 1

April 5, 1966

D. RICHMAN 3,244,807

SIGNAL-PRECORRECTING APPARATUS FOR MINIMIZING QUADRATURE DISTORTION

Original Filed Jan. 24, 1957

3 Sheets-Sheet 3

United States Patent Office 3,244,807

Patented Apr. 5, 1966

3,244,807

SIGNAL-PRECORRECTING APPARATUS FOR MINIMIZING QUADRATURE DISTORTION

Donald Richman, Fresh Meadows, N.Y., assignor to Hazeltine Research, Inc., Chicago, Ill., a corporation of Illinois Continuation of application Ser. No. 636,198, Jan. 24, 1957. This application June 9, 1961, Ser. No. 116,210
11 Claims. (Cl. 178—6)

GENERAL

This invention relates to signal-precorrecting apparatus and, particularly, to such apparatus for use in the transmitter of a vestigial-side-band communicaitons system to precorrect the transmitted signal for quadrature distortion inherent to envelope detection of the single-side-band portion of the transmitted signal in a receiver.

This application is a continuation of application Serial No. 636,198, filed January 24, 1957, and entitled, "Signal-Precorrecting Apparatus for Minimizing Quadrature Distortion."

One of the most common types of vestigial-side-band communications system is the present-day television system. In such systems, vestigial-side-band transmission is utilized in order to save spectrum band width. To this end, both lower and upper side bands are transmitted for only the low-frequency modulation components of the message or intelligence being transmitted. Only one set of side bands of the higher frequency message components is transmitted. By not transmitting the other set of side bands of these higher frequency components, the amount of signal spectrum required for the total signal is reduced.

As is widely known, envelope detection by, for example, a simple diode detector circuit of signal components transmitted in a single-side-band manner produces so-called "quadrature" distortion of the detected signal. Such distortion arises from the presence in the detected signal of undesired additional single-side-band components which are in phase quadrature, that is, 90° out of phase, with the received carrier signal. In a television system, such undesired quadrature components are particularly bothersome because, in addition to distorting the detected signal, they serve to increase the apparent carrier level. In a negative modulation system, like the present-day television system, such apparent increase in carrier level causes a suppression of the brightness level of the corresponding portion of the reproduced image.

Many schemes have been heretofore proposed for minimizing the quadrature distortion caused by envelope detection of the single-side-band portion of a transmitted signal. Some of these schemes involve transmitter modifications, others involve receiver modifications, while some involve both transmitter and receiver modifications. Considering specifically the case of television systems, large numbers of television receivers of conventional design are already in existence. It would, therefore, be most desirable to have some means for correcting the quadrature distortion whereby such correction can be carried out wholly at the transmitter. This would improve the quality of the reproduced image without additional expense to existing receiver owners. In addition, it would be desirable to have a flexible technique for minimizing quadrature distortion which would be readily applicable to improved types of receivers having improved signal-handling characteristics.

The schemes heretofore proposed for minimizing envelope detector quadrature distortion by means of a correction which is applied at the transmitter have generally involved a judicious choice of frequency-versus-transmission pass-band characteristics such that the best compromise between quadrature distortion and direct distortion of the desired in-phase components is obtained. In general, such schemes have been limited to modification of only the lower frequency-modulation components which are transmitted in a partially double-side-band manner. It would, however, be desirable to have a method of correcting such distortion over substantially the entire spectrum of the transmitted signal. Also, it would be desirable to have a more complete form of correction not involving compromise between the different forms of distortion. In the case of a television system, the previously proposed schemes have been generally limited to use with receivers having particular specific types of signal-translating characteristics which are different from those of present-day television receivers and, hence, not readily usable with such present-day receivers.

It is an object of the invention, therefore, to provide new and improved apparatus for minimizing quadrature distortion which avoids one or more of the foregoing limitations of such apparatus heretofore proposed.

It is another object of the invention to provide new and improved signal-precorrecting apparatus for use in the transmitter of a vestigial-side-band communications system for precorrecting envelope detector quadrature distortion over substantially the whole range of signal components which are transmitted in a purely single-side-band manner.

It is a further object of the invention to provide new and improved signal-precorrecting apparatus for use in the transmitter of a vestigial-side-band communications system whereby envelope detector quadrature distortion occurring in a receiver may be minimized by means of equipment modifications required only at the transmitter.

It is an additional object of the invention to provide new and improved signal-precorrecting apparatus for use in a television transmitter for minimizing the visible effects of envelope detector quadrature distortion in the reproduced images of existing television receivers without any added expense to the receiver owner.

In obtaining the desired signal precorrection, it appears desirable to impart a certain phase shift to a relatively wide band video signal which, in the present case, represents part of the intelligence or information which is to be transmitted. Phase-shifting circuits heretofore proposed for shifting the phase of an electrical signal are generally of relatively limited band width and, hence, are not suitable for use with a wide band video signal. Accordingly, the present invention also relates to a new and improved wide band phase shifter and it is an additional object of the invention to provide such a new and improved phase shifter.

In accordance with one feature of the invention, a communications system comprises a transmitter for transmitting an amplitude-modulated carrier signal including an intelligence-signal component, part of which is transmitted in a single-side-band manner and a receiver including an envelope detector for detecting the intelligence-signal component, such envelope detection of the single-side-band portion of the intelligence-signal component causing quadrature distortion of the detected signal. The system additionally includes means included in the transmitter comprising circuit means for deriving a signal representative of the quadrature distortion, and circuit means responsive to the representative signal for modifying the intelligence signal prior to encoding on the carrier signal to precorrect for such quadrature distortion.

In accordance with another feature of the invention, signal-precorrecting apparatus for use in the transmitter of a communications system where at least a part of an intelligence signal is transmitted in a single-side-band manner comprises circuit means for supplying an intelligence signal and circuit means for deriving a signal for generating a quadrature signal representative of envelope detector quadrature distortion. The invention additionally includes circuit means responsive to the representative signal for modifying the intelligence signal prior to encoding on a carrier signal to precorrect for quadrature distortion caused by envelope detection of the single-side-band portion of the transmitted intelligence signal in a receiver.

For a better understanding of the present invention, together with other and further objects thereof, reference is had to the following description taken in connection with the accompanying drawings, and its scope will be pointed out in the appended claims.

Referring to the drawings.

Figures 1, 2, 3, 4:
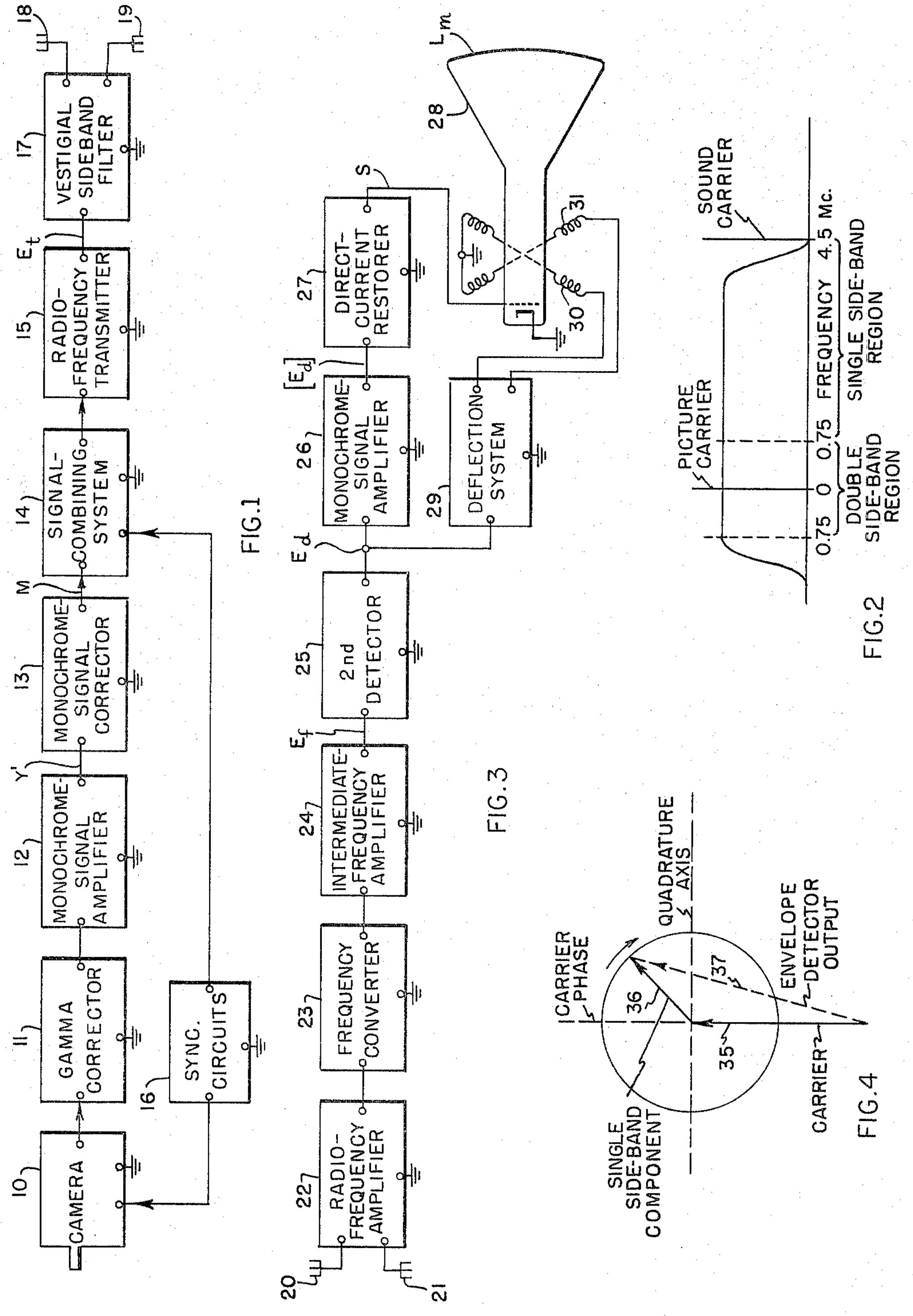
FIG. 1 is a circuit diagram of a representative embodiment of a television transmitter including signal-precorrecting apparatus constructed in accordance with the present invention.
FIG. 2 is a graph representing the amplitude-versus-frequency characteristic of the transmitter.
FIG. 3 is a circuit diagram of a representative embodiment of a television receiver.
FIG. 4 is a vector diagram used in explaining the operation of the receiver of FIG. 3.

*FIG. 1.—Transmitter*

The present invention shall be particularly described for the case where it is used in a television system, the reason being that a television system is such a common and important form of vestigial-side-band communications system in present-day use. Referring to FIG. 1 of the drawings, there is shown a transmitter for transmitting an amplitude-modulated carrier signal including an intelligence-signal component, part of which is transmitted in a single-side-band manner. More particularly, the transmitter of FIG. 1 represents a television transmitter, in which case the intelligence signal is the monochrome or black-and-white picture signal which is transmitted by such transmitter.

The transmitter of FIG. 1 includes a camera 10 for developing an electrical signal representative of the scene being televised and a gamma corrector 11 for precorrecting the developed signal in the usual manner to compensate for the nonlinear characteristics of the image-reproducing device or picture tube in the receiver. Such gamma-corrected signal is then supplied by way of a monochrome-signal amplifier 12, a monochrome-signal corrector 13 which is constructed in accordance with the present invention, and a signal-combining system 14 to a radio-frequency transmitter 15. The operation of the monochrome-signal corrector will be ignored for the present. Also supplied to the signal-combining system 14 are the usual line-deflection and field-deflection synchronizing pulses which are developed by sync circuits 16. The signal-combining system 14 is effective to develop the composite video signal which is then encoded onto the radio-frequency carrier by the radio-frequency transmitter 15. The resulting amplitude-modulated carrier signal is supplied to a vestigial-side-band filter 17 and then to an antenna system 18, 19 whereby it is radiated towards the neighboring receivers.

The effect of the vestigial-side-band filter 17 may be seen by referring to FIG. 2 which is a graph representing the amplitude-versus-frequency characteristic of the transmitter. For convenience, the picture carrier frequency is taken as the zero reference frequency to which the frequencies of the side-band components are referenced. As there indicated, side-band components of the amplitude-modulated carrier signal lying within approximately 0.75 megacycle of the picture carrier are transmitted in the conventional double-side-band manner. The vestigial-side-band filter 17 is effective to suppress the lower frequency set of side-band components which is further removed from the picture carrier than 0.75 megacycle. As a result, the video-frequency information lying in the 0.75–4.5 megacycle range is transmitted in a single-side-band manner or, in other words, only the upper set of side bands of such video information is transmitted. It is primarily the single-side-band transmission of these 0.75–4.5 megacycle video components which gives rise to the undesired quadrature distortion in the receiver and it is these components which will be precorrected by the signal-precorrecting apparatus represented by the monochrome-signal corrector 13, the operation of which will be mentioned in detail hereinafter.

*FIG. 3.—Receiver*

Referring now to FIG. 3 of the drawings, there is shown a representative embodiment of a typical present-day black-and-white television receiver. Such receiver includes an antenna system 20, 21 for intercepting the transmitted signal which, in turn, is supplied to a radio-frequency amplifier 22 and a frequency converter 23. The frequency converter 23, which may include the usual modulator and local oscillator circuits, is effective to change the signal frequency down to an intermediate-frequency value and the resulting intermediate-frequency amplitude-modulated carrier signal is then amplified by an intermediate-frequency amplifier 24. The intermediate-frequency signal is then supplied to a second detector 25 which is an envelope detector such as, for example, a conventional diode detector and which serves to separate the video-frequency modulation components from the intermediate-frequency carrier signal. The resulting composite video signal is then supplied by way of a monochrome-signal or video amplifier 26 and direct-current restoring means 27 to an image-reproducing device or picture tube 28. The deflection synchronizing components of the composite video signal are supplied to a deflection system 29 which, in response thereto, is effective to develop the usual scanning currents which, in turn, are supplied to deflection windings 30 and 31 for causing the usual deflection of the electron beam of the picture tube 28 to form the desired raster pattern. While a black-and-white television receiver is shown, it is apparent that the FIG. 3 receiver could also be used to represent the monochrome-signal portion of a color-television receiver.

The effect of envelope detection by the second detector 25 on the single-side-band components of the transmitted signal may be seen by referring to the vector diagram of FIG. 4. The vectors of FIG. 4 denote intermediate-frequency components at the input of the second detector 25. The carrier component is represented by vector 35. The detection of the double-side-band (0–0.75 mc.) components is essentially in accordance with conventional detector theory. The single-side-band modulation components, however, are continually varying in phase relative to the carrier phase as indicated, for example, by the vector 36 which represents one of these components. If the component denoted by vector 36 represented a sine-wave modulation component and had been transmitted in a double-side-band manner, then another vector rotating in the opposite direction would also be present and would represent the other side band of such component. In that case, the phase of the resultant of the two side-band vectors would always correspond to the carrier phase and no variations would be produced along the quadrature axis. The envelope detector 25 which responds to the resultant or peak value of the intermediate-frequency components would then produce an output signal which is sinusoidal in wave form. Suppression of one of the side bands, however, results in only the one side-band vector, represented by vector 36, and, accordingly, the phase of the resultant signal varies as indicated by vector 37. A graph representing the amplitude variation with time of the resultant vector 37 would show that the resulting output signal is not sinusoidal in wave form but rather is asymmetrical in shape relative to the peak carrier level. The corresponding distortion is termed "quadrature distortion" because it arises from the quadrature component or quadrature effect of the single-side-band signal. In addition, the asymmetrical nature of the resultant signal causes an apparent increase in the peak carrier level which, as mentioned, tends to suppress the brightness or luminance level of the corresponding portion of the image reproduced on the face of the picture tube 28.

MATHEMATICAL DERIVATION OF REQUIRED SIGNAL PRECORRECTION

In accordance with the present invention, the quadrature distortion arising from envelope detection of the single-side-band portion of the transmitted signal is to be precorrected for at the transmitted by the monochrome-signal corrector 13. To this end, the monochrome-signal corrector 13 contains the requisite circuits for performing the desired modification of the conventional monochrome signal Y′ supplied thereto. Before the precorrection can be performed, however, it is necessary to know the nature of the modification which is required. Accordingly, there shall now be given a mathematical derivation which derives an equation which describes the modification required of the conventional monochrome signal Y′ to produce the properly precorrected signal M.

The desired relationship between the conventional or present practice monochrome signal Y′ developed at the transmitter and the corresponding reproduced picture brightness or luminance displayed on the face of the picture tube 28 in the receiver may be described by the following mathematical expression:

$$L_m=(Y')^2 \qquad (1)$$

where:

$Y'$=gamma-corrected present practice monochrome signal $L_m$=luminace reproduced by picture tube in receiver in response to the monochrome signal.

The prime symbol of the Y′ signal denotes that such signal has been gamma-corrected. In the case of a monochrome transmitter, such correction is obtained by rising the signal to the $1/\gamma$ power where $\gamma$ represents the nonlinearity of the picture tube 28 in the receiver. For most present-day picture tubes, $\gamma$ is approximately equal to 2. The square-law relation of Equation 1 assumes a $\gamma$ of 2.

In order to determine how far the actual relationship between the conventional monochrome signal and the reproduced luminance departs from the desired relationship, it is necessary to derive an expression which takes into account the translation of the signal through the various circuits between the transmitter and the receiver picture tube 28. To this end, it is convenient to start with the signal $E_t$ appearing at the output of the radio-frequency transmitter 15 and which may be defined by the following expression:

$$E_t=(1-E)\cos\omega_c t \qquad (2)$$

where:

E=video modulation $\omega_c$=angular frequency of carrier $t$=time.

Equation 2 is the conventional way of expressing a modulated carrier signal with the exception that the minus sign denotes the negative modulation technique used in television transmission.

The video modulation E may be represented by the following expression:

$$E=u_o+\sum_k u_k\cos\omega_k t \qquad (3)$$

where:

$u_o$=portion of video-signal modulation transmitted in double-side-band manner (0.075 megacycle portion of signal)

$u_k\cos\omega_k t$=a component of the video-signal modulation which is transmitted in a single-side-band manner.

The summation sign denotes that this term represents the sum of all the components which are to be transmitted in a single-side-band manner. This relationship of Equation 3 may then be substituted into Equation 2 and the Σ term expanded to contain terms representative of both upper and lower side bands. The lower side-band terms are then omitted because such side bands are suppressed by the vestigial-side-band filter 17. The resultant signal is then transmitted to the receiver wherein it is amplified by the radio-frequency amplifier 22 and then supplied to the frequency converter 23 which is effective to convert the frequency scale down to an intermediate-frequency range. In other words, the output of the frequency converter 23 is similar to the transmitted signal except that the frequency scale has been changed to the intermediate-frequency value. This signal is then amplified by the intermediate-frequency amplifier 24 to produce an output signal $E_f$ which may be represented by the following expression:

$$E_f=(1-u_o)\cos\omega_f t-\sum_k Z_k u_k\cos(\omega_f t-\omega_k t) \qquad (4)$$

where:

$\omega_f$=intermediate-frequency value of carrier angular frequency $Z_k$=receiver frequency-response or selectivity factor.

Equation 4 corresponds to the equation for the signal which is transmitted by the transmitter except that the carrier-frequency terms $\omega_f$ are in terms of the intermediate-frequency carrier value and the factor $Z_k$, representing the frequency-response factor of the receiver particularly the intermediate-frequency amplifier 24, has been introduced. This factor $Z_k$ represents the gain factor of, for example, the intermediate-frequency amplifier 24 as a function of the individual frequency components making up the single-side-band portion of the signal. In most present-day receivers, the pass band of the intermediate-frequency amplifier 24 is relatively flat over the single-side-band region in which case the frequency-response factor $Z_k$ is a constant. Such factor is, nevertheless, included in the derivation to preserve the generality thereof so that the results will be equally as applicable to other and, perhaps, improved forms of receiver frequency-response characteristics.

By trignometric identity, Equation 4 may be expanded to the following form:

$$E_f=(1-u_o)\cos\omega_f t-\left[\sum_k Z_k u_k\cos\omega t_k\cdot\cos\omega_f t+\sum_k Z_k u_k\cos(\omega_k t-90^\circ)\cdot\sin\omega_f t\right] \qquad (5)$$

wherein the single-side-band term is separated into an in-phase cosine term and a quadrature-phase sine term.

To simplify the derivation, the following definitions will now be made:

$$u \equiv \sum_k Z_k u_k \cos \omega_k t \qquad (6)$$

$$u^x \equiv \sum_k Z_k u_k \cos (\omega_k t - 90°) \qquad (7)$$

The superscript symbol "$x$" of Equation 7 does not represent a factor raised to the "$x$" power but rather is an arbitrary symbol which is utilized to denote the fact that this is a quadrature-phase term that differs in phase by $-90°$ from the signal components represented by the term "$u$." In this manner, "$u$" represents in-phase modulation components over the single-side-band region while "$u^x$" denotes quadrature-phase modulation components over the same single-side-band region. Using these definitions to simplify Equation 5, such equation may be represented by the following expression:

$$E_f = (1 - u_o) \cos \omega_f t - u \cos \omega_f t - u^x \sin \omega_f t \qquad (8)$$

Equation 8 represents the signal supplied to the second detector 25 which is an envelope detector having the form of, for example, a simple diode detector circuit. In other words, the detector 25 responds only to the resultant modulation fluctuations of the signal supplied thereto. As represented by Equation 8, such input signal contains in-phase and quadrature-phase signal components and, hence, the output of detector 25, which is denoted by the symbol $E_d$, may be represented by the following expression which represents the vector sum of the input components:

$$E_d = \sqrt{(1 - u_o - u)^2 + (u^x)^2} \qquad (9)$$

Equation 9 may be re-expressed as follows:

$$E_d = \sqrt{1 + y} \qquad (10)$$

where $y$ is used to represent all the $u$ terms as follows:

$$y = -2(u_o + u) + (u_o + u)^2 + (u^x)^2 \qquad (11)$$

Equation 10 may now be expanded in terms of a power series as follows:

$$E_d = 1 + \frac{1}{2}y - \frac{1}{8}y^2 + \frac{1}{16}y^3 - \frac{5}{128}y^4 + \frac{35}{1280}y^5 \qquad (12)$$

This power series may be evaluated by determining the squares, cubes, etc. of the $y$ term represented by Equation 11. Such higher power $y$ terms are as follows:

$$y^2 = 4(u_o + u)^2 + 2(u_o + u)^2(u^x)^2 - 4(u_o + u)(u^x)^2 + \text{higher power terms} \qquad (13)$$

$$y^3 = 12(u_o + u)^2(u^x)^2 + \text{higher power terms} \qquad (14)$$

$$y^4 = \text{higher power terms} \qquad (15)$$

Now, substituting the relations of Equations 11, 13, 14, and 15 in Equation 12, Equation 12 may then be expressed as follows:

$$E_d = 1 - (u_o + u) + ½(u_o + u)^2(u^x)^2 + ½(u_o + u)(u^x)^2 + ½(u^x)^2 + \text{higher power terms} \qquad (16)$$

Equation 16 represents the detected signal $E_d$ in terms of a power series. Such signal is then translated by a video amplifier represented by the monochrome-signal amplifier 26. Accordingly, to obtain a first order solution, the signal appearing at the output of the monochrome-signal amplifier 26 may be represented by the following expression:

$$[E_d] \approx 1 - [u_o + u] + ½[(u_o + u)^2(u^x)^2] + ½[(u_o + u)(u^x)^2] + ½[(u^x)^2] \qquad (17)$$

where the terms higher than the second power have been ignored and the square brackets have been included to denote the band-width limiting occurring in the amplifier 26.

The derivation up to this point has been taken with the zero carrier level as the reference level from which signal amplitude variations are measured. This reference level is now changed by the action of the direct-current restorer 27 which serves to establish the black level (blanking level) as the reference level from which amplitude variations are measured. This change in reference level is now changed by the action of the direct-current restorer 27 which serves to establish the black level (blanking level) as the reference level from which amplitude variations are measured. This change in reference level may be denoted by the following expression:

$$S = 1 - [E_d] \qquad (18)$$

wherein S denotes the signal appearing at the output of the direct-current restorer 27. Because of the square-law nature of the picture tube 28, this expression is more useful in its squared form which is as follows:

$$S^2 = (1 - [E_d])^2 \qquad (19)$$

The equation may now be expressed in terms of the modulation components, $u$, $u_o$, and $u^x$ by substituting Equation 17 into Equation 19 the result of which is represented by the following expression:

$$S^2 \approx [u_o + u]^2 - [u_o + u][(u_o + u)(u^x)^2] - [u_o + u][(u^x)^2] \qquad (20)$$

Up to this point, it has been assumed that the video modulation represented by the $u$ terms could vary over the entire carrier-level range from the zero carrier level up to the blanking level (0.75 peak carrier level). This, however, is not actually the case because the current television-signal standards restrict the video amplitude variations to the range from reference white (0.125 peak carrier level) to the blanking level. Accordingly, in order to preserve the normalized form of the equations such that 100 percent amplitude is equal to unity, it is necessary to change the scale factors if we wish to speak correctly in terms of video-signal amplitudes as opposed to carrier-modulation amplitudes. The necessary conversion factor is denoted by the following expression:

$$\frac{\text{Video Range}}{\text{Modulation Range}} = \frac{\text{Blanking-to-White}}{\text{Blanking-to-Zero}} = \frac{62.5}{75} = \frac{5}{6} \qquad (21)$$

In other words, assuming a 100 percent video amplitude variation, then, in terms of the carrier-modulation range, this corresponds to a variation of five-sixths times 100 percent or 83 percent of the carrier range from blanking level to zero carrier level. Accordingly, the signal S in terms of carrier-modulation amplitude at the input of the picture tube 28 may be expressed in terms of video amplitude as follows:

$$S = ⅚V \qquad (22)$$

where:

V = video signal at picture tube 28 (0–4.2 megacycles).

Similarly, it follows that the following relations also hold:

$$S^2 = (⅚)^2V^2 = (⅚)^2L_m \qquad (23)$$

where the actual signal V is used in place of the desired signal Y' in Equation 1 and $$u_o = ⅚M_o \qquad (24)$$

where $M_o$ = double-side-band portion of monochrome video signal (0.75–4.2 megacycles) and $$u = ⅚\underline{M} \qquad (25)$$

where $\underline{M}$ = single-side-band portion of monochrome video signal (0.75–4.2 megacycles) and $$u^x = ⅚\underline{M}^x \qquad (26)$$

where $\underline{M}^x$ = phase-shifted (−90°) single-side-band portion of monochrome video signal (0.75–4.2 megacycles).

Also, the total transmitted monochrome signal M may be expressed as the sum of the double-side-band and single-side-band video components as follows:

$$M=M_o+\underline{M} \quad (27)$$

Substituting the relationships of Equations 23–26, inclusive, into Equation 20 and simplifying by the relationship of Equation 27, then Equation 20 becomes:

$$L_m \approx [M^2]-\tfrac{25}{36}[M][M(\underline{M}^x)^2]-\tfrac{5}{6}[M][(\underline{M}^x)^2 \quad (28)$$

Equation 28 expresses the relationship between the transmitter video signal M and the corresponding luminance $L_m$ reproduced on the picture tube 28 of the receiver. As mentioned in connection with Equation 1, it is desired that the relationship between the unmodified conventional monochrome video signal Y′ and the reproduced picture luminance $L_m$ be as follows:

$$L_m=(Y')^2 \quad (29)$$

Therefore, this desired result will be obtained if the reproduced luminance actually developed, as represented by Equation 28, is the same as the desired reproduced luminance represented by Equation 29. Ignoring the square brackets denoting video band-width limiting, this desired equality may be represented by the following expression:

$$(Y')^2 \approx M^2-\tfrac{25}{36}M^2(\underline{M}^x)^2-\tfrac{5}{6}M(\underline{M}^x)^2 \quad (30)$$

The expression of Equation 30 gives the final form of the derivation in the sense that it describes the relationship between the conventional uncorrected monochrome signal Y′ and the monochrome signal M which is actually transmitted. In order to know how to modify the uncorrected monochrome signal Y′, it is necessary to solve Equation 30 for M.

One approximate solution of Equation 30 may be obtained by defining M as follows:

$$M=(Y')+b \quad (31)$$

where $b$=additional component necessary to correct present practice (Y′) signal.

This expression for M may then be substituted into the right-hand terms of Equation 30 containing the quadrature terms $\underline{M}^x$. Then, these latter terms may be expanded and the resulting terms containing the correction factor "$b$" may be omitted because both the correction factor "$b$" and the square of the quadrature terms $\underline{M}^x$ are small so that their product is relatively minor compared to the other terms. When this is done, the resulting equation may then be solved for M and the solution is as follows:

$$M \approx \sqrt{(Y')^2\left[1+\frac{25}{36}(\underline{M}^x)^2\right]+\frac{5}{6}Y'(\underline{M}^x)^2} \quad (32)$$

Equation 32 gives us one form of modification required of the uncorrected monochrome signal Y′ which is necessary to produce the desired precorrected monochrome signal M. As will be noted, the essential feature is that the uncorrected monochrome signal Y′ must be modified in accordance with certain fractions of the quadrature term $\underline{M}^x$ which term, in turn, represents the envelope detector quadrature distortion which will subsequently be encountered in the receiver. The nonlinear form of the equation, namely the square and square roots, results from the nonlinear nature of the picture tube 28 in the receiver.

Equation 32 may be stated in a simplified form by defining the different proportions of the quadrature terms as follows:

$$\left.\begin{aligned}\alpha&=1+\frac{25}{36}(\underline{M}^x)^2\\ \delta&=\frac{5}{6}(\underline{M}^x)^2\end{aligned}\right\} \quad (33)$$

These definitions enable the expression of Equation 32 to be simplified to the following form:

$$M \approx \sqrt{\alpha(Y')^2+\delta Y'} \quad (34)$$

As will be mentioned more in deaail hereinafter, this form of correction as represented by Equation 34 may be obtained by utilizing the apparatus described in FIG. 5.

A more exact form of solution of Equation 30 may be obtained by utilizing the usual quadratic solution. More specifically, Equation 30 may be simplified by making the following definition:

$$\beta=1-\tfrac{25}{36}(\underline{M}^x)^2 \quad (35)$$

and may then be rearranged in the following form:

$$\beta M^2-\delta M-(Y')^2=0 \quad (36)$$

The quadratic solution of Equation 36 is as follows:

$$M=\frac{\gamma}{2\beta}+\sqrt{\left(\frac{\delta}{2\beta}\right)^2+\frac{(Y')^2}{\beta}} \quad (37)$$

This form of correction as represented by Equation 37 may be obtained by use of the apparatus of FIG. 6 which will be described hereinafter.

Figure 5:
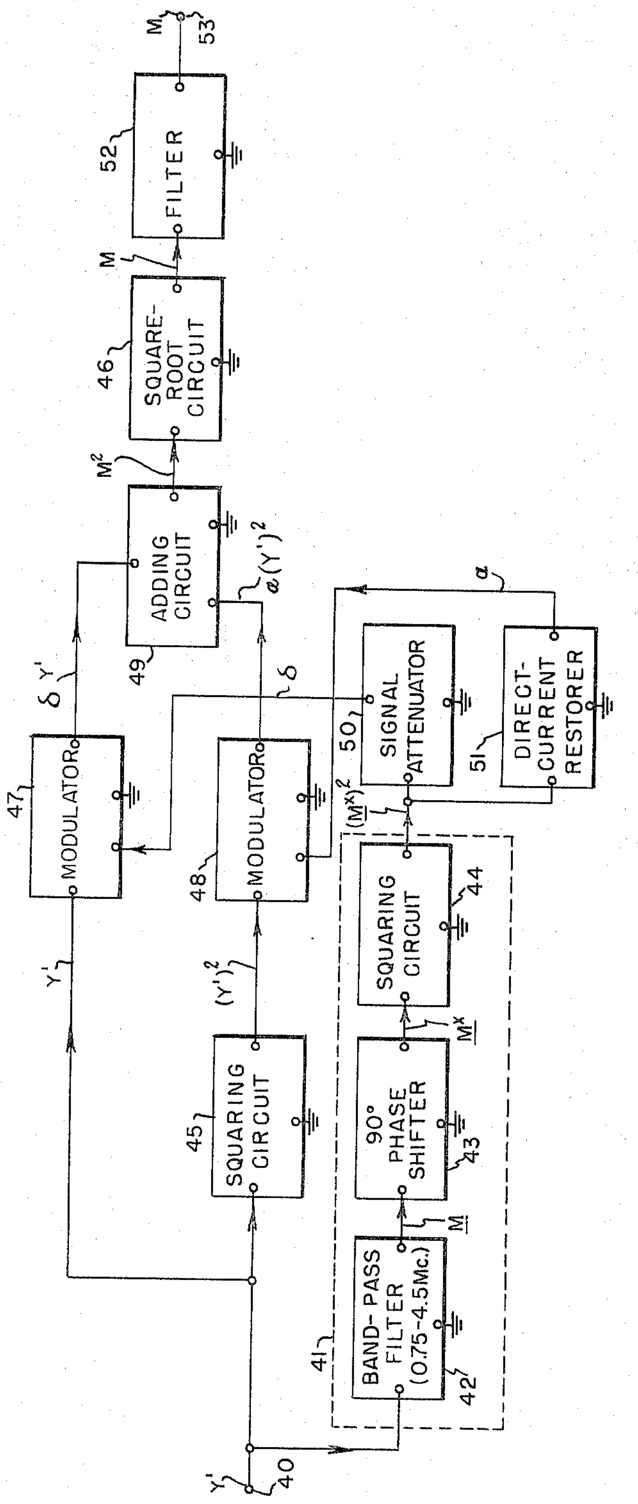
FIG. 5 is a circuit diagram of a representative embodiment of signal-precorrecting apparatus constructed in accordance with the present invention.

*Description of FIG. 5.—Signal-precorrecting apparatus*

Referring now to FIG. 5 of the drawings, there is shown signal-precorrecting apparatus for use in a television transmitter where at least a monochrome-signal component is partially transmitted in a single-side-band manner. More specifically, the apparatus of FIG. 5 represents in detail one form of apparatus that may be used as the monochrome-signal corrector 13 of the FIG. 1 transmitter. To this end, the apparatus of FIG. 5 includes circuit means for supplying a monochrome signal which circuit means may be represented by the input terminal 40 as well as the other portions of the transmitter which are coupled to this terminal 40 for supplying a conventional monochrome signal Y′ thereto.

The apparatus of FIG. 5 also includes circuit means responsive to the single-side-band portion of the monochrome video signal Y′ for generating a quadrature signal $\underline{M}^x$ representative of envelope detector quadrature distortion. This circuit means may be termed a "quadrature-signal generator" and is represented by the units within the dashed line box 41. In the case of a television system, the quadrature-signal generator 41 preferably includes nonlinear circuitry having a nonlinearity corresponding to the nonlinearity of the receiver image-reproducing device or picture tube. More specifically, the quadrature-signal generator 41 may include a band-width limiting filter 42, a phase shifter 43, and a squaring circuit 44. The phase shifter 43 is preferably a 90° phase shifter for generating a quadrature-phased replica of the single-side-band portion of the input monochrome signal. Because such single-side-band portion is relatively wide band in nature, a novel type of phase shifter, as will be described more particularly in connection with FIG. 7, may be used as the phase shifter 43. The band-width limiting filter 42 may be of the band-pass type, as indicated, or, instead, might be of the highpass type. Squaring circuits, such as the squaring circuit 44, are relatively widely known in the art and may take any one of several forms. For example, such squaring circuit might include a modulator tube wherein the signal to be squared is supplied to two different control electrodes thereof so that, in effect, such signal is multiplied by itself to produce the desired squaring action.

The apparatus of FIG. 5 also includes circuit means responsive to the quadrature signal for modifying the single-side-band portion of the monochrome video signal Y′ to precorrect for quadrature distortion caused by envelope detection of the single-side-band portion of the transmitted monochrome signal in a receiver. Such circuit means is represented generally by the remainder of the units of the FIG. 5 apparatus. More particularly, such circuit means may include a squaring circuit 45, modulator circuit means, and a square-root circuit 46 for translating the monochrome video signal. The modulator circuit means may include a pair of modulators 47 and 48 and an adding circuit 49. The square-root circuit 46 may, for example, take the form of any of the well-known types of gamma-corrector circuits which are well known in the art.

The circuit means responsive to the quadrature signal for modifying the monochrome video signal also includes matrixing circuit means for proportioning the quadrature signal and for supplying proportioned quadrature-signal components to the modulator circuit means 47 and 48 for modifying the single-side-band portion of the monochrome signal to obtain the desired precorrection for quadrature distortion. More specifically, such matrixing circuit means may include a signal attenuator 50 and a direct-current restorer 51.

Where the signal precorrection is to be applied at video frequencies, as represented by the representative location of the monochrome-signal corrector 13 of FIG. 1, then the signal-precorrecting apparatus may also include circuit means for supplying the modified monochrome signal M to the carrier-signal encoder of the transmitter, that is, to the radio-frequency transmitter itself. Such circuit means may include, for example, a suitable filter 52 and the output terminal 53 at which appears the properly precorrected monochrome signal M.

*Operation of FIG. 5.—Signal-precorrecting apparatus*

Considering now the operation of the apparatus of FIG. 5 just described, such apparatus serves to modify the conventional or present practice monochrome signal Y′ supplied thereto in accordance with the relationship expressed by Equation 34 to produce the desired signal precorrection. More specifically, the input signal Y′ is squared by the squaring circuit 45, translated by the modulator 48 and adding circuit 49, and then square-rooted by the square-root circuit 46. Assuming that no other signals are supplied to the modulator 48 and adding circuit 49, then the successive squaring and square-root operations would result in the original Y′ signal appearing at the output terminal 53. Modification of the conventional Y′ signal does, however, occur in the modulator 48 and, additionally, due to the further components added in at the adding circuit 49, produces the desired modification to precorrect the quadrature distortion. Such modification is performed primarily on the squared signal, as represented by modulator 48, in order to take into account the nonlinear effects of the picture tube at the receiver.

Modification of the conventional Y′ signal is obtained by generating a so-called "quadrature signal" which gives a measure of the quadrature distortion which will be subsequently suffered in the receiver. Such quadrature signal is developed by the quadrature-signal generator 41 which is effective to pass the single-side band portion $\underline{M}$ of the Y′ video signal and then to phase-shift these single-side-band components by the quadrature factor of 90° to develop a quadrature signal $\underline{M}^x$. This signal is then squared by the squaring circuit 44 to take into account the nonlinear effects of the receiver picture tube. This squared quadrature signal is then proportioned by the signal attenuator 50 and the direct-current restorer 51 to develop the desired $\alpha$ and $\delta$ terms as defined by Equation 33. With regard to the $\alpha$ term, the direct-current restorer 51 is effective to establish the unity reference level to which the desired proportion of the square quadrature signal is added as indicated by Equation 33. The proper fraction of this signal may be obtained by properly proportioning the attenuation in the input circuit of the direct-current restorer 51.

In this manner, a signal corresponding to the $\alpha$ term is developed which is representative of part of the desired modification of the Y′ monochrome signal and, hence, is supplied to the modulator 48 to modulate or control the amplitude thereof in accordance with such factor. Similarly, a signal representative of the $\delta$ term is supplied to the modulator 47 for modulating the unsquared Y′ signal supplied thereto. The unsquared or linear Y′ term, as modified and supplied to the adding circuit 49, is necessary in order to compensate for linear distortion components which are effectively coupled in by the envelope detector quadrature distortion in the receiver. This so-called linear term is then combined with the modified square term in the adding circuit 49 and the resultant signal $M^2$ is supplied to the square-root circuit 46 to produce at the output thereof the precorrected monochrome signal M as defined by Equation 34.

Figure 6:
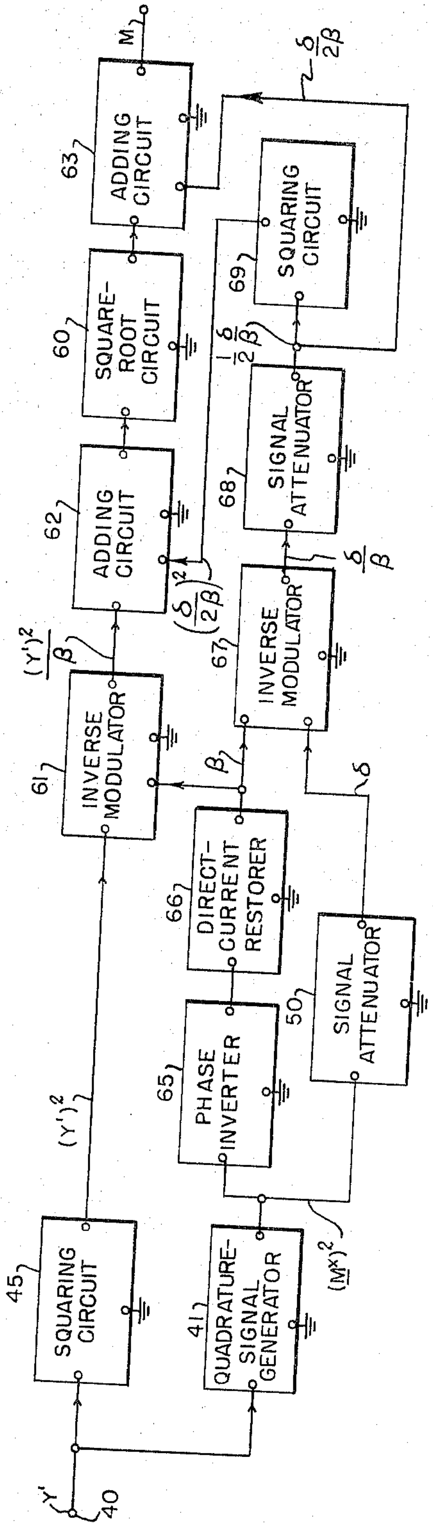
FIG. 6 is a circuit diagram of another embodiment of signal-precorrecting apparatus constructed in accordance with the present invention.

*Description of FIG. 6.—Signal-precorrecting apparatus*

Referring now to FIG. 6 of the drawings, there is shown an alternative embodiment of signal-precorrecting apparatus that may be used as the monochrome-signal corrector 13 of the FIG. 1 transmitter. The parts of the FIG. 6 apparatus which correspond to parts of the FIG. 5 apparatus have been indicated by the same reference numerals. In particular, the quadrature-signal generator 41 has been shown as a single box instead of showing the details thereof as in FIG. 5.

Like the apparatus of FIG. 5, the apparatus of FIG. 6 includes circuit means responsive to the quadrature signal developed by the generator 41 for modifying the monochrome signal Y′ to precorrect the quadrature distortion. Such means includes the squaring circuit 45, modulator circuit means, and a square-root circuit 60. In this case, the modulator circuit means includes an inverse modulator 61 and a pair of adding circuits 62 and 63. The signal-modifying circuit means also includes matrixing circuit means represented by the signal attenuator 50, a phase inverter 65, a direct-current restorer 66, another inverse modulator 67, another signal attenuator 68, and a squaring circuit 69. The inverse modulators 61 and 67 may, for example, take the form of a pentode modulator tube having a pair of input control electrodes where the tube is operated so that the characteristic for one of the input electrodes is such that it is nonlinear in nature. This utilizes the fact that a nonlinear input-output characteristic may be designed to give an output that is approximately the reciprocal of the input. Such reciprocal is then multiplied with the signal supplied to the other input control electrode in accordance with conventional modulator theory to produce the desired inversely modulated signal at the output.

*Operation of FIG. 6.—Signal-precorrecting apparatus*

Considering now the operation of the FIG. 6 signal-precorrecting apparatus just described, such apparatus modifies the conventional monochrome signal Y′ in accordance with the relation described by Equation 37 to produce the desired precorrected signal M which is subsequently supplied to the radio-frequency transmitter. As before, the successive squaring and square-root operations performed by squaring circuit 45 and square-root circuit 60 would, in the absence of other signals, result in an output signal corresponding to the original input signal Y′. Such signal is, however, modified while in a square condition by the inverse modulator 61. The factor by which it is modified or multiplied is the reciprocal of the $\beta$ term as defined by Equation 35. Such term, as is indicated, represents a certain proportion of the squared quadrature signal $\underline{M}^x$ generated by the quadrature-signal generator 41. The desired proportioning is obtained by the phase inverter 65 which serves to supply the minus sign and the direct-current restorer 66 which serves to supply the unity reference factor from which the negative signal is subtracted as indicated in Equation 35.

Additional quadrature factors are added in by the adding circuits 62 and 63 in accordance with the corresponding terms of Equation 37. Thus, one term is added by the adding circuit 62 before the square-root operation occurs while the other term is added by the adding circuit 63 after the squaring operation has occurred. As indicated, these additional terms represent further proportions of the squared quadrature signal $\underline{M}^x$ and are obtained by multiplying the $\delta$ term by the reciprocal of the $\beta$ term in the inverse modulator 67, reducing the resultant ratio by a factor of one-half in the signal attenuator 68, and then supplying the resultant to both the adding circuit 63 and the squaring circuit 69. The squaring circuit 69, in turn, squares the resultant signal before it is supplied to the adding circuit 62. In this manner, the resulting precorrected monochrome signal M appearing at the output of the circuit 63 is properly modified in accordance with the relations described by Equation 37.

Figure 7:
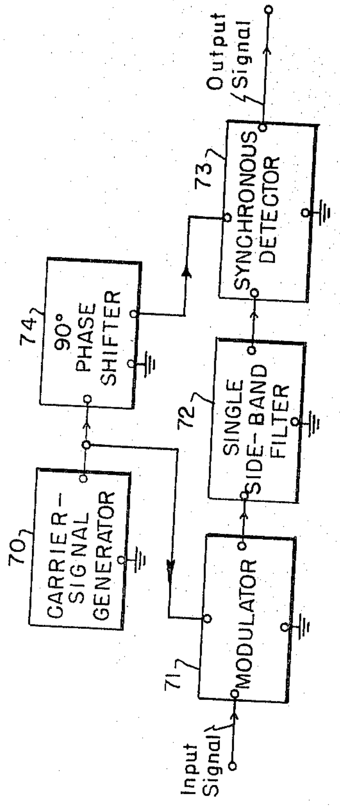
FIG. 7 is a circuit diagram of a wide band phase shifter which may be used in the present invention.

*FIG. 7.—Wide band phase shifter*

Referring now to FIG. 7 of the drawings, there is shown an adjustable phase shifter circuit which is capable of handling rather wide band video signals and, hence, is particularly suited for use as the phase shifter in the quadrature-signal generator 41 of either the FIG. 5 or FIG. 6 apparatus. This wide band phase shifter of FIG. 7 operates on the fact that single-side-band carrier-modulation components are continually varying in phase and upon the fact that synchronous detection of such signal components may be utilized to extract such components at any desired phase angle.

More particularly, as shown in the representative embodiment of FIG. 7, a carrier signal of suitable carrier frequency is generated by a carrier-signal generator 70 and then supplied to a modulator 71. Also supplied to the modulator 71 is an input signal which represents the video signal which is to be phase-shifted. The modulator 71 is effective to encode the input signal as amplitude modulation of the carrier signal in a conventional manner. The resulting carrier signal which is double side band in nature is then supplied to a single-side-band filter 72 which suppresses one of the sets of side bands thereby producing a single-side-band signal at the output thereof. In this manner, the input signal is converted to single-side-band modulation components which, because they are single side band in nature, are continually varying in phase relative to the carrier phase.

Such single-side-band components are then supplied to a synchronous detector 73. Also supplied to the synchronous detector 73 is the carrier signal developed by the carrier-signal generator 70 after being translated by a phase shifter 74. The carrier signal reaching the synchronous detector 73 by way of the phase shifter 74 is unmodulated in nature, that is, of constant amplitude but of the same frequency as the carrier signal upon which the input signal is encoded. In accordance with conventional synchronous detector theory, such unmodulated carrier signal heterodynes with the single-side-band components to reduce them directly to video frequency, that is, to detect them. In other words, the difference-frequency components arising from the heterodyning action are of video frequency the same as if the modulated carrier signal had been detected by a simple diode detector.

It is an important characteristic of the synchronous detector 73, however, that the phase of the video output signal from the detector 73 corresponds to the phase of the unmodulated constant amplitude carrier signal supplied to the synchronous detector 73 by way of the phase shifter 74. In other words, synchronous detection of single-side-band components changes the phase but not the amplitude of such components. Thus, the desired phase shift that is produced is the phase shift which is given to the unmodulated carrier signal as it passes through the phase shifter 74. This phase shift may be selected to be any desired value.

The important point is that the phase shifter 74 need not be in any way wide band in nature and, in fact, the band width thereof might be very narrow. This is because the phase shifter 74 only has to translate a single frequency component, namely, the unmodulated carrier signal. The band width of the input video signal, on the other hand, is determined by the band widths of the modulator 71, the single-side-band filter 72, and the synchronous detector 73 and, hence, these units must have band widths corresponding to the band width of the input video signal. It is well known, however, how to build these units with relatively wide band widths. Accordingly, the phase-shifting apparatus of FIG. 7 represents a new and improved way of obtaining the desired phase shift of a relatively wide band video signal.

CONCLUSION

From the foregoing descriptions of the various embodiments of the invention it will be apparent that signal-precorrecting apparatus constructed in accordance with the present invention represents new and improved apparatus for use in the transmitter of a vestigial-side-band communications system for precorrecting envelope detector quadrature distortion which would otherwise occur in the receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A communications system comprising: a transmitter for transmitting an amplitude-modulated carrier signal including an intelligence-signal component, part of which is transmitted in a single-side-band manner; a receiver including an envelope detector for detecting the intelligence-signal component, such envelope detection of the single-side-band portion of the intelligence-signal component causing quadrature distortion of the detected signal; and means included in the transmitter comprising circuit means for deriving a signal representative of said quadrature distortion, and circuit means responsive to said representative signal for modifying the intelligence signal prior to encoding on the carrier signal, to precorrect for such quadrature distortion.

2. A communications system comprising: a transmitter for transmitting an amplitude-modulated carrier signal including an intelligence-signal component, part of which is transmitted in a single-side-band manner; a receiver including an envelope detector for detecting the intelligence-signal component, such envelope detection of the single-side-band portion of the intelligence-signal component causing quadrature distortion of the detected signal; and means including in the transmitter comprising nonlinear circuit maens responsive to the intelligence signal for generating a quadrature signal representative of said quadrature distortion and nonlinear circuit means responsive to said quadrature signal for modifying the intelligence signal prior to encoding on the carrier signal to precorrect for such quadrature distortion.

3. A television system comprising: a transmitter for transmitting an amplitude-modulated carrier signal including at least a monochrome-signal component, part of which is transmitted in a single-side-band manner; a receiver including an envelope detector for detecting the monochrome component, such envelope detection of the single-side-band portion of the monochrome component causing quadrature distortion of the detected signal; and means included in the transmitter comprising nonlinear circuit means responsive to the monochrome signal for generating a quadrature signal representative of said quadrature distortion and nonlinear circuit means responsive to said quadrature signal for modifying the single-side-band portion as well as the double-side-band portion of the monochrome signal prior to encoding on the carrier signal to precorrect for such quadrature distortion.

4. A television system comprising: a transmitter for transmitting an amplitude-modulated carrier signal including at least a monochrome-signal component, part of which is transmitted in a single-side-band manner; a receiver including an envelope detector for detecting the monochrome component, such envelope detection of the single-side-band portion of the monochrome component causing quadrature distortion of the detected signal; and means included in the transmitter comprising circuit means for deriving a signal representative of said quadrature distortion, and circuit means responsive to said representative signal for modifying the single-side-band portion as well as the double-side-band portion of the monochrome signal prior encoding on the carrier signal to precorrect for such quadrature distortion.

5. A television system comprising: a transmitter for transmitting an amplitude-modulated carrier signal including at least a monochrome-signal component, part of which is transmitted in a single-side-band manner; a receiver including an envelope detector for detecting the monochrome component, a monochrome-signal channel of limited band width coupled to the detector for translating the monochrome signal, and a nonlinear image-reproducing device coupled to the monochrome channel for reproducing the televised image, such envelope detection of the single-side-band portion of the monochrome component causing quadrature distortion of the detected signal which is subsequently modified by the band-width-limited monochrome channel and nonlinear image-reproducing device and produces spurious effects in the reproduced image; and means included in the transmitter comprising circuit means, having a nonlinearity corresponding to the nonlinearity of the receiver image-reproducing device and responsive to the monochrome signal, for generating a nonlinear quadrature signal representative of envelope detector quadrature distortion after nonlinear processing thereof, and circuit means responsive to the quadrature signal for modifying the single-side-band portion as well as the double-side-band portion of the monochrome signal prior to encoding on the carrier signal to precorrect for such quadrature distortion in the receiver.

6. Sginal precorrecting apparatus for use in the transmitter of a communications system where at least a part of an intelligence signal is transmitted in a single-side-band manner, the apparatus comprising:
- circuit means for supplying an intelligence signal;
- circuit means for deriving a signal representative of envelope detector quadrature distortion;
- and circuit means responsive to said representative signal for modifying the intelligence signal prior to encoding on a carrier signal to precorrect for quadrature distortion caused by envelope detection of the single-side-band portion of the transmitted intelligence signal in a receiver.

7. Signal-precorrecting apparatus for use in the transmitter of a communications system where at least a part of an intelligence signal is transmitted in a single-side-band manner, the apparatus comprising: circuit means for supplying an intelligence signal; circuit means responsive to the intelligence signal for generating a quadrature signal representative of envelope detector quadrature distortion; and circuit means responsive to the quadrature signal for modifying the intelligence signal prior to encoding on a carrier signal to precorrect for quadrature distortion caused by envelope detection of the single-side-band portion of the transmitted intelligence signal in a receiver.

8. Signal-precorrecting apparatus for use in the transmitter of a communications system where at least a part of an intelligence signal is transmitted in a single-side-band manner, the apparatus comprising: circuit means for supplying an intelligence signal; nonlinear circuit means responsive to the intelligence signal for generating a quadrature signal representative of envelope detector quadrature distortion; and nonlinear circuit means responsive to the quadrature signal for modifying these signal-side-band portion of the intelligence signal prior to encoding on a carrier signal to precorrect for quadrature distortion caused by envelope detection of the single-side-band portion of the transmitted intelligence signal in a receiver.

9. Signal-precorrecting apparatus for use in a television transmitter where at least a monochrome-signal component is partially transmitted in a single-side-band manner, the apparatus comprising: circuit means for supplying a monochrome signal; circuit means responsive to the monochrome signal for generating a quadrature signal representative of envelope detector quadrature distortion; and circuit means responsive to the quadrature signal for modifying the single-side-band portion of the monochrome signal prior to encoding on a carrier signal to precorrect for quadrature distortion caused by envelope detection of the single-side-band portion of the transmitted monochrome signal in a receiver.

10. Signal-precorrecting apparatus for use in a television system where at least a monochrome-signal component is partially transmitted in a single-side-band manner and the receiver includes a nonlinear image-reproducing device, the apparatus comprising: circuit means for supplying a monochrome video signal; nonlinear circuit means, having a nonlinearity corresponding to the nonlinearity of the receiver image-reproducing device and responsive to the single-side-band portion of the monochrome video signal, for generating a nonlinear quadrature signal representative of envelope detector quadrature distortion after nonlinear processing thereof; nonlinear circuit means responsive to the quadrature signal for modifying the single-side-band portion of the monochrome video signal to precorrect for quadrature distortion caused by envelope detection of the single-side-band portion of the transmitted monochrome signal in a receiver; and circuit means for supplying the modified monochrome video signal to the carrier-signal encoder of the transmitter.

11. Signal-precorrecting apparatus for use in a television transmitter where at least a monochrome-signal component is partially transmitted in a single-side-band manner, the apparatus comprising: circuit means for supplying a monochrome video signal; a first signal channel coupled to the supply circuit means and including a squaring circuit, modulator circuit means, and a square-root circuit for translating the monochrome video signal; a second signal channel coupled to the supply circuit means and including a band-width-limiting filter, a phase shifter, and a squaring circuit for generating a quadrature signal representative of envelope detector quadrature distortion; matrixing circuit means for proportioning the quadrature signal and for supplying proportioned quadrature-signal components to the modulator circuit means of the first signal channel for modifying the single-band portion of the monochrome video signal to precorrect for quadrature distortion caused by envelope detection of the single-side-band portion of the transmitted monochrome signal in a receiver; and circuit means for supplying the modified monochrome video signal to the carrier-signal encoder of the transmitter.

References Cited by the Examiner

UNITED STATES PATENTS

| | | | |
|---|---|---|---|
| 2,552,588 | 5/1951 | Reeves | 178—7.1 X |
| 2,668,238 | 2/1954 | Frink | 328—155 |
| 2,717,956 | 9/1955 | Elgin | 325—65 |
| 2,777,900 | 1/1957 | Cowan | 332—37 X |
| 2,798,201 | 7/1957 | Moulton et al. | 332—1 |
| 2,849,537 | 8/1958 | Eglin | 325—65 |
| 3,011,018 | 11/1961 | Sullivan | 178—6 |

DAVID G. REDINBAUGH, *Primary Examiner.*

ROBERT SEGAL, *Examiner.*